Patented Oct. 24, 1922.

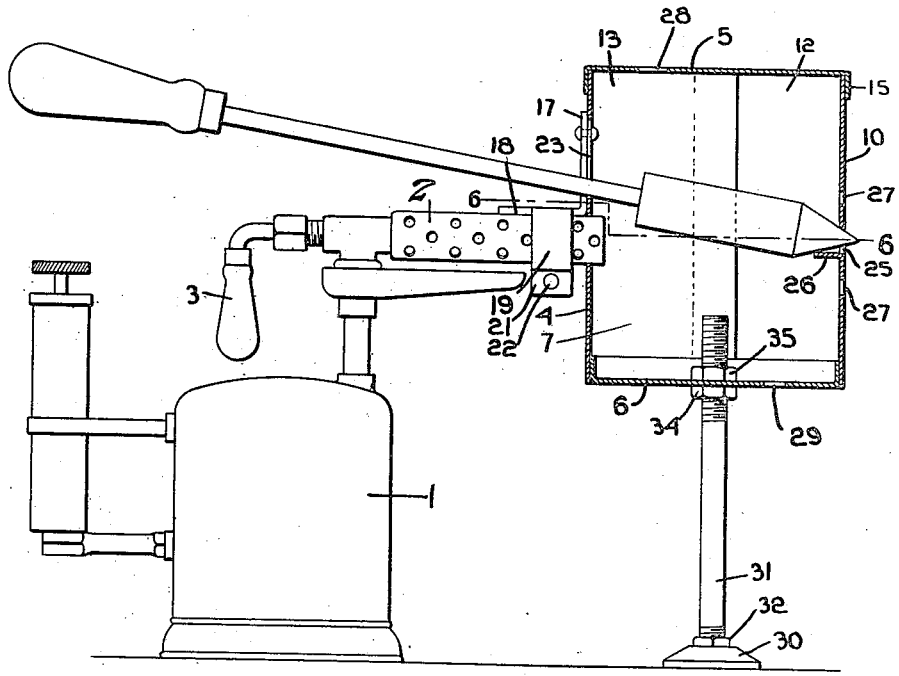
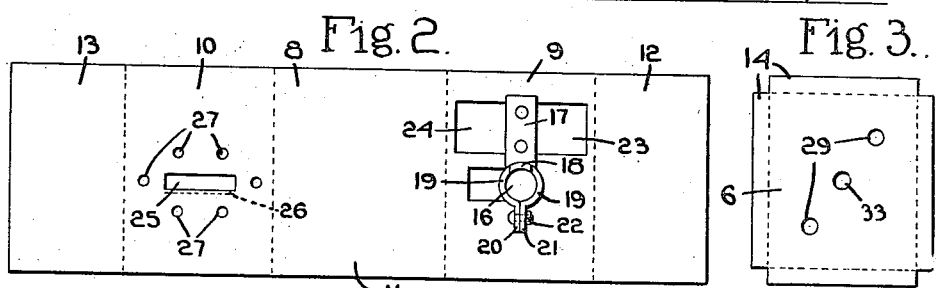
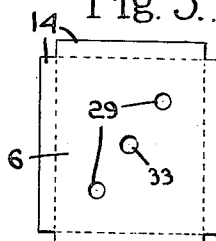
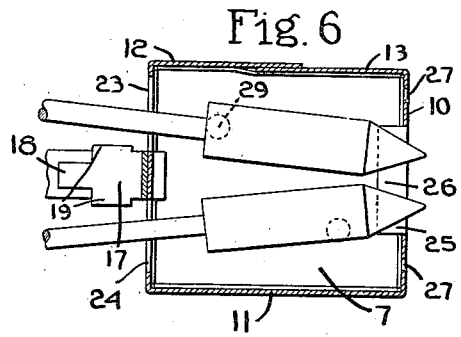
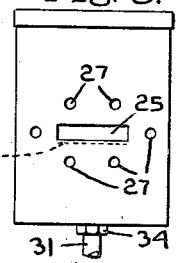
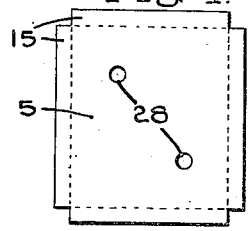

1,432,801

UNITED STATES PATENT OFFICE.

MELVILLE V. STREIT, OF MEDFORD, MASSACHUSETTS.

BLOWTORCH FURNACE.

Application filed February 3, 1922. Serial No. 533,851.

*To all whom it may concern:*

Be it known that I, MELVILLE V. STREIT, a citizen of the United States, and resident of Medford, county of Middlesex, State of Massachusetts, have invented an Improvement in Blowtorch Furnaces, of which the following description, in connection with the accompanying drawing, is a specification, like characters on the drawing representing like parts.

This invention relates to improvements in blow torch furnaces and the object thereof is to provide a simple and convenient portable furnace which may be attached readily to a usual type of blow torch for the purpose of supporting and heating articles, such as soldering irons and the like.

More particularly the object of the invention is to provide a furnace for a blow torch which can be readily attached to the blow torch for the purpose of heating soldering irons and which can be used either indoors or out-of-doors where exposed to the wind.

Usual soldering furnaces, such as are used in soldering the seams of sheet metal roofs, or such as are used by plumbers, and other artisans, are relatively heavy and difficult to transport. Furthermore, such furnaces require a considerable time to heat soldering irons and other tools.

The present invention is designed to provide a furnace which may be employed with the usual type of gasolene blow torch which is a relatively small tool used for various purposes. It comprises a relatively small chamber the walls of which are preferably formed of sheet metal. One of the walls is provided with an aperture to receive the end of the blow torch and another aperture to permit the introduction of the tool. Means are provided within the chamber for supporting the tool or tools to be heated. This whole furnace desirably is supported upon an adjustable standard by means of which the furnace may be supported in proper relation to the end of the blow torch. Preferably, suitable clamping means are provided for securing the blow torch burner to the furnace in such a manner that when assembled the torch and furnace will not tip over.

A further object of the invention is to provide a blow torch furnace capable of heating a plurality of soldering irons in which the flame of the blow torch is so distributed as to impinge effectively upon all sides of the soldering irons.

A further object of the invention is to provide a blow torch furnace of such construction that very high heat will be maintained within the chamber of the furnace without unduly heating the walls of the furnace.

Other objects and features of the invention will more fully appear from the following description and the annexed drawings and will be particularly pointed out in the claims.

In the drawings:

Fig. 1 shows an elevation of a blow torch and a preferred form of furnace associated therewith, the body of the furnace being shown in vertical section;

Fig. 2 shows a development of the side walls of the preferred form of furnace as formed from a continuous sheet, the transverse dotted lines indicating the lines of fold of the sheet when it is bent into rectangular form;

Fig. 3 is a development of the base of the furnace;

Fig. 4 is a development of the top of the furnace;

Fig. 5 is an elevation of the rear face of the furnace; and

Fig. 6 is a horizontal sectional view on line 6—6, Fig. 1, showing also a portion of the end of the blow torch burner.

The preferred embodiment of the invention is illustrated herein as applied to a usual form of portable blow torch 1 having a burner 2 with a valve mechanism operable by a handle 3 to regulate the flame which is projected from the end of the burner. The furnace comprises a body or casing 4, preferably of rectangular cross section, having a top 5 and a bottom 6 forming a substantially closed chamber 7 into which the flame from the blow torch is projected. The side walls of the casing may be conveniently made of a single strip of sheet metal 8, (see Fig. 2), which is adapted to be bent into rectangular form. For convenience in construction this sheet metal plate may be bent upon the lines indicated to present a front wall 9 having suitable apertures to receive the end of the blow torch burner and the articles to be heated as will hereinafter more fully appear, a rear wall 10 having outlet apertures and closed side walls, the wall 11 preferably being plain while the opposite side wall is formed by two relatively narrow sections 12 and 13 adapted to be overlapped and secured together in any suitable manner as by spot-welding or riveting.

The bottom 6 of the furnace desirably is formed of a single sheet of metal having flanges 14 bent upwardly at right angles thereto and fitting tightly within the walls of the chamber 7. These flanges 14 preferably are secured to the wall of the chamber by spot-welding or riveting.

The top 5 of the furnace preferably is detachably secured to the upper end of the body 4. It may be constructed of a flat metallic plate having flanges 15 bent downwardly to enclose and fit upon the upper ends of the walls of the body. Thus the top or cover can be readily removed for the purpose of cleaning the interior of the device.

The front wall 9 of the body or casing is provided with an aperture 16 into which the end of the blow torch burner may be inserted. A bracket 17, preferably of sheet metal, is secured to the casing and provided with a lateral extension 18 having curved arms 19 adapted to embrace the burner of the blow torch and preferably provided with parallel end flanges 20 and 21 having a bolt 22 passing therethrough by means of which the arms 19 may be clamped firmly upon the burner.

The front wall of the furnace is provided with an aperture, or preferably two apertures 23 and 24 to permit the introduction of soldering irons, or other articles to be heated, these apertures preferably being on opposite sides of the bracket 17 to which the burner of the torch is secured.

The rear wall 10 of the casing is provided with an outlet aperture 25 which desirably is located approximately in the horizontal plane of the axis of the burner. This aperture desirably is formed by stamping out and bending inwardly a portion of the rear wall 10 to provide a ledge 26 upon which the end of the article to be heated may rest. It will, however, be understood that a suitable bracket may be provided if desired instead of forming the ledge as aforesaid.

Desirably a plurality of smaller outlet apertures 27 surround the outlet aperture 25 for the purpose of more freely permitting the escape of the products of combustion from the blow torch which are projected against the rear wall.

Outlet apertures 28 are desirably provided in the top and inlet apertures 29 in the bottom to permit a relatively slight circulation of air to pass upwardly through the chamber 7 so that the products of combustion which accumulate in the chamber will not be forced backwardly through the apertures 16, 23 and 24 in the front wall.

Preferably an adjustable support is provided in order that the furnace may be supported at the proper height in relation to the torch burner with which it is connected. A convenient support comprises a stand or pedestal having a base 30 having a screw threaded opening in which the screw threaded end of a pipe or standard 31 is secured by a lock nut 32. The upper end of the pipe or standard 31 is screw threaded and passes through a suitable aperture 33 in the base. Nuts 34 and 35 upon said standard, engaging respectively the under and upper faces of the base, provide means by which the height of the bottom of the furnace from the floor may be adjusted so that when the bracket 18 of the furnace is clamped upon the burner of the blow torch the standard will be of a correct length to rest upon the same plane as that upon which the bottom of the blow torch rests.

By reason of this construction a convenient form of blow torch furnace is provided which can be readily assembled upon, or removed from, the blow torch burner. Thus the furnace can be readily packed in a journeyman's kit and assembled upon the blow torch burner at the place where it is to be used.

In the operation of the device as assembled the flame from the blow torch is projected into the chamber 7 in the direction of the outlet 25. The article or articles to be heated, such as soldering irons, are inserted through one or both of the apertures 23 and 24 until their ends rest upon the ledge 26. When, for example, soldering irons are thus inserted and rest in this position the flame of the blow torch plays upon the under faces of the iron and by reason of the upwardly ascending current of air which enters the aperture 29 in the base and escapes through the aperture 28 in the top the flame is caused to divide and substantially encircle both of the soldering irons. The outlet aperture 25 which is opposite the burner enables the larger portion of the products of combustion to escape almost directly in line with the burner so that the full length of flame is caused to play upon the soldering irons or articles which are supported in the chamber as aforesaid. In view of the fact that, aside from the apertures above described, the chamber is substantially closed, the heat of the burner which is reflected from the walls upon the articles to be heated aids in increasing the temperature of the articles. By reason of the fact that the walls of the furnace are all exposed directly to the air and present relatively large surfaces the radiation is sufficient to prevent undue heating of the walls of the furnace.

The preferred type of furnace disclosed herein is found to be very convenient for the purpose of heating two soldering irons such as are usually used by tinsmiths, plumbers, and other artisans, and it is found that two soldering irons weighing from one-half pound to one pound each can be heated to the desired soldering temperature in a period from five to ten minutes when the blow torch furnace is exposed in the open air with a fair wind blowing and with the blow torch only turned partially on. It is also found that the radiation from the walls of the furnace is such that under ordinary conditions of use said walls do not become unduly heated.

After completion of the use of the furnace with a blow torch it rapidly cools so that it can soon be removed and packed in the usual kit-bag. By reason of the substantially closed construction of this blow torch furnace it may be employed safely in shops without fear of setting fire to the adjacent objects as the flame of the torch is wholly enclosed and the walls of the furnace do not attain such high temperature as to ignite a wooden wall or partition even though the latter is located in quite close proximity to the furnace.

It will be understood that the embodiment of the invention disclosed herein is of an illustrative character and is not restrictive and that various modifications in construction, form and arrangement of parts may be made within the spirit and scope of the following claims.

Having thus described my invention, what I claim as new, and desire to secure by Letters Patent, is:

1. A blow-torch furnace comprising a substantially closed chamber having at one side an aperture to receive the end of a blow-torch burner and an opening adjacent thereto to permit the introduction of an article to be heated, and upon the opposite side an outlet and means for supporting the article to be heated at or above the axis of the blow-torch burner.

2. A blow-torch furnace comprising a substantially closed chamber having at one side an aperture to receive the end of a blow-torch burner and an opening adjacent thereto to permit the introduction of an article to be heated, and upon the opposite side an outlet, means for supporting the article to be heated at or above the axis of the blow-torch burner and an outlet aperture at the top of said chamber to permit the escape of the gases.

3. A blow-torch furnace comprising a substantially closed chamber having at one side an aperture to receive the end of a blow-torch burner and an opening adjacent thereto to permit the introduction of an article to be heated, and upon the opposite side an outlet, means for supporting the article to be heated at or above the axis of the blow-torch burner, one or more inlets at the bottom of said chamber and one or more outlets at the top of said chamber to permit the escape of the gases.

4. A blow-torch furnace comprising a substantially closed chamber having sheet metal walls provided at one side with an opening to receive the end of a blow-torch burner and also with an aperture to permit the introduction of an article to be heated, and at its opposite side provided with an outlet aperture and means for supporting the article to be heated within the said chamber.

5. A blow-torch furnace comprising a substantially closed chamber having sheet metal walls, one side having an opening to receive the end of a blow-torch burner and an aperture located over said burner aperture to permit the introduction of an article to be heated, the portion of the side of said chamber opposite said burner being cut to provide an outlet aperture and bent inward to form a ledge to support the end of the article to be heated.

6. A blow-torch furnace comprising a substantially closed chamber having sheet metal walls, one side having an opening to receive the end of a blow-torch burner and an aperture located over said burner aperture to permit the introduction of an article to be heated, the portion of the side of said chamber opposite said burner being cut to provide an outlet aperture and bent inward to form a ledge to support the end of the article to be heated and a series of apertures surrounding said outlet aperture.

7. A blow-torch furnace comprising a substantially closed chamber having walls formed of sheet metal, one side being provided with an aperture to receive the end of the blow-torch burner, a depending bracket secured to said side having means for clamping said burner, apertures through said side on opposite sides of said bracket to receive a plurality of articles to be heated, an outlet aperture opposite said burner and means for supporting the articles to be heated at or above the line of the axis of said burner.

8. A blow-torch furnace comprising a chamber having its walls formed of sheet metal, the sides of said chamber being formed of a continuous sheet of metal bent into rectangular form, one side having an aperture to receive the end of the blow-torch burner, and an aperture to permit the introduction of the article to be heated, and the opposite side having an outlet aperture and a ledge formed by bending inwardly the metal displaced in forming said aperture, a bottom having a flange rigidly secured to said sides and a top.

9. A blow-torch furnace comprising a chamber having its walls formed of sheet metal, the sides of said chamber being formed of a continuous sheet of metal bent into rectangular form, one side having an aperture to receive the end of the blow-torch burner, and an aperture to permit the introduction of the article to be heated, and the opposite side having an outlet aperture and a ledge formed by bending inwardly the metal displaced in forming said aperture, a bottom having a flange rigidly secured to said sides, and a removable top having a flange embracing the upper end of said sides.

10. A blow-torch furnace comprising a substantially closed chamber having at one side an aperture to receive the end of a blow-torch burner and an opening adjacent thereto to permit the introduction of an article to be heated, and upon the opposite side an outlet and means for supporting the article to be heated at or above the axis of the blow-torch burner and an adjustable standard for supporting said furnace in proper relation to the height of the blow-torch burner.

11. A blow-torch furnace comprising a substantially closed chamber having at one side an aperture to receive the end of a blow-torch burner and an opening adjacent thereto to permit the introduction of an article to be heated, and upon the opposite side an outlet and means for supporting the article to be heated at or above the axis of the blow-torch burner and an adjustable standard for supporting said furnace in proper relation to the height of the blow-torch burner comprising a base, a standard secured to said base and having at its upper end a screw threaded portion extending through the bottom of said furnace and nuts on the screw threaded portion of said standard adapted to secure said furnace in adjusted positions.

In testimony whereof, I have signed my name to this specification.

MELVILLE V. STREIT.